(12) United States Patent
Yin et al.

(10) Patent No.: US 7,641,348 B2
(45) Date of Patent: Jan. 5, 2010

(54) INTEGRATED PORTABLE COMPUTER PROJECTOR SYSTEM

(75) Inventors: Memphis-Zhihong Yin, Houston, TX (US); Stacy L. Wolff, Houston, TX (US); Paul J. Doczy, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 11/344,039

(22) Filed: Jan. 31, 2006

(65) Prior Publication Data

US 2007/0177115 A1 Aug. 2, 2007

(51) Int. Cl.
*G03B 21/14* (2006.01)
*G03B 21/22* (2006.01)
*G03B 21/00* (2006.01)
*G09G 3/18* (2006.01)

(52) U.S. Cl. ................... 353/119; 353/122; 345/52
(58) Field of Classification Search ............. 353/119, 353/43, 39, 72; 348/168, 740, 552; 345/52
See application file for complete search history.

(56) References Cited

U.S. PATENT DOCUMENTS

| | | | |
|---|---|---|---|
| 5,090,800 A | 2/1992 | Ushiro | |
| 5,341,154 A | 8/1994 | Bird | |
| 5,483,250 A | 1/1996 | Herrick | |
| 5,510,861 A | 4/1996 | Minich et al. | |
| 5,677,827 A | 10/1997 | Yoshioka et al. | |
| 5,826,962 A | 10/1998 | Rodriguez, Jr. | |
| 5,847,748 A | 12/1998 | Laughlin | |
| 5,865,522 A * | 2/1999 | Gold ........................ | 353/102 |
| 6,104,447 A | 8/2000 | Faris | |
| 6,424,335 B1 | 7/2002 | Kim et al. | |
| 6,525,750 B1 | 2/2003 | Knox | |
| 6,525,767 B2 | 2/2003 | Saito et al. | |
| 6,626,543 B2 * | 9/2003 | Derryberry .............. | 353/119 |
| 6,636,339 B2 | 10/2003 | Lee | |
| 6,806,850 B2 | 10/2004 | Chen | |
| 6,873,356 B1 * | 3/2005 | Kanbe et al. ............ | 348/207.1 |
| 7,350,923 B2 * | 4/2008 | Olson et al. ............. | 353/30 |
| 2002/0063855 A1 | 5/2002 | Williams | |
| 2003/0071791 A1 * | 4/2003 | Hanson et al. ........... | 345/169 |
| 2003/0117343 A1 | 6/2003 | Kling | |
| 2007/0285344 A1 * | 12/2007 | Plut ......................... | 345/3.1 |

* cited by examiner

*Primary Examiner*—Georgia Y Epps
*Assistant Examiner*—Ryan Howard

(57) ABSTRACT

An integrated portable computer projector system comprises an image projector integrally couplable to a computer device.

19 Claims, 3 Drawing Sheets

INTEGRATED PORTABLE COMPUTER PROJECTOR SYSTEM

BACKGROUND OF THE INVENTION

Optical projectors are used during meetings, conferences and/or other occasions for displaying output from a computer device (e.g., from a laptop or notebook computer). However, such optical projectors are bulky, heavy, require a substantial amount of power for their operation and/or require the presenter to transport multiple items to the presentation location.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
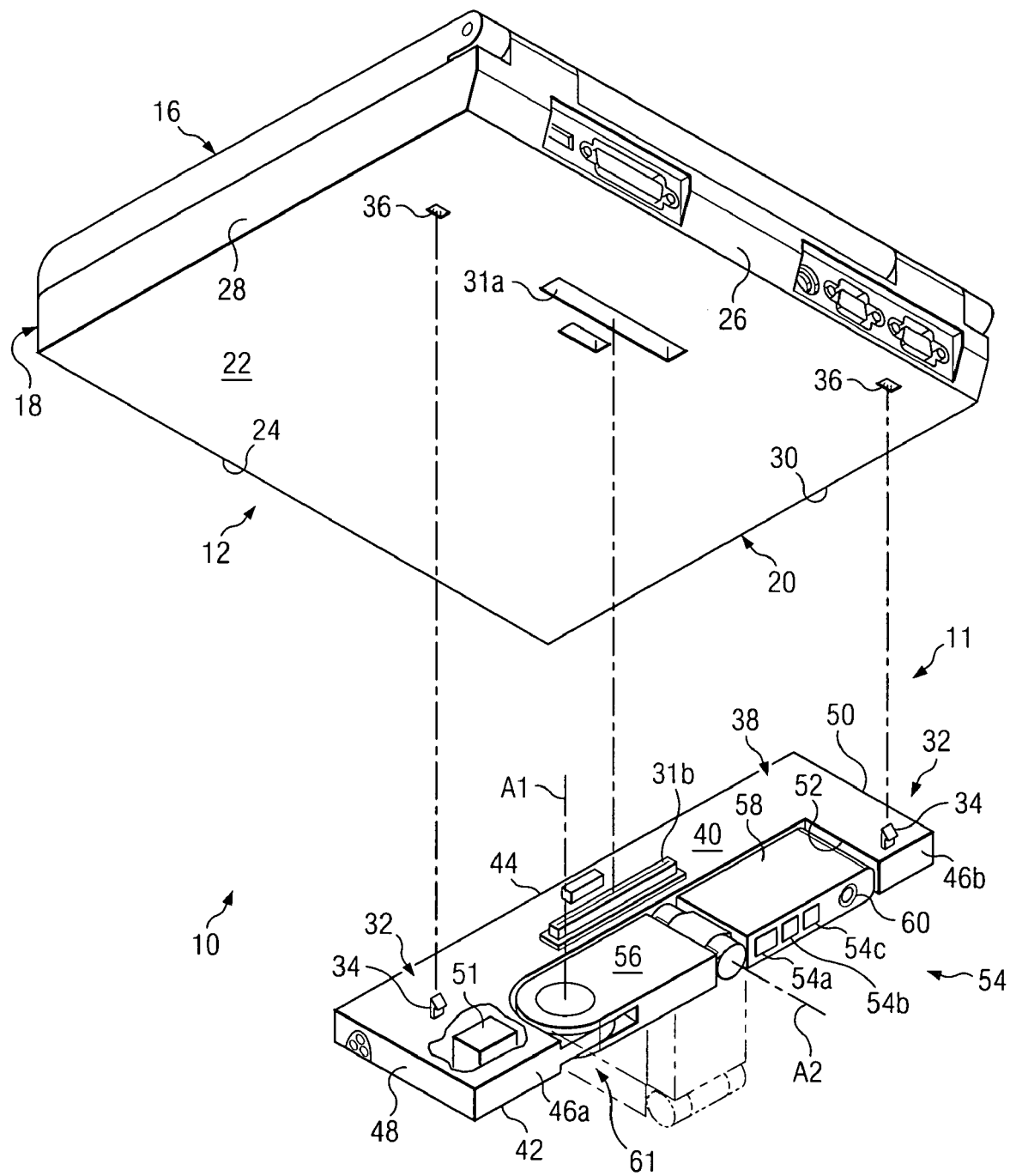
FIG. 1 is a diagram illustrating an embodiment of an integrated portable computer projector system in accordance with the present invention.

FIG. 1 is a diagram illustrating an embodiment of an integrated portable computer projector system 10 in accordance with the present invention. In the embodiment illustrated in FIG. 1, system 10 comprises a power supply 11 with integrated image projector 54 that is removably couplable to a computer device 12. As used herein, an "image projector" comprises a device configured to project image content onto a surface spaced-apart therefrom (e.g., a wall or projector screen). In the embodiment illustrated in FIG. 1, computer device 12 comprises a laptop or notebook computer having a display member 16 rotatably coupled to a base member 18. However, it should be understood that computer device 12 may comprise other types of devices such as, but not limited to, tablet personal computers, personal digital assistants, or any other type of portable computer device.

In the embodiment illustrated in FIG. 1, base member 18 of computer device 12 comprises a housing 20 having a bottom surface 22, a front surface 24, a rear surface 26 and a pair of side surfaces 28 and 30. In the illustrated embodiment, bottom surface 22 comprises at least one connector port 31a for communicatively engaging and/or otherwise cooperating with a corresponding connector port 31b of power supply 11. System 10 comprises a locking mechanism 32 to enable power supply 11 to be releasably secured to base member 18. For example, in the embodiment illustrated in FIG. 1, locking mechanism 32 comprises a plurality of hooks 34 disposed on power supply 11 configured to be insertable into a plurality of corresponding openings 36 disposed on bottom surface 22 of base member 18. However, it should be understood that other devices or methods may be used to removably couple power supply 11 to computer device 12. It should be further understood that power supply 11 may be otherwise located relative to computer device 12 (e.g., at a location other than bottom surface 22).

In the embodiment illustrated in FIG. 1, power supply 11 comprises a housing 38 having a top surface 40, a bottom surface 42, a front surface 44, rear surfaces 46a and 46b, and a pair of side surfaces 48 and 50. Housing 38 is preferably configured having a plurality of battery cells 51 stored therein to provide power to image projector 54 and/or computer device 12. In the embodiment illustrated in FIG. 1, housing 38 comprises a recessed area 52 configured to receive and store image projector 54 within an overall profile of power supply 11 when image projector 54 is not in use. However, it should be understood that image projector 54 may be otherwise stored (even extending at least partially beyond the overall profile of power supply 11). In some embodiments of the present invention, image projector 54 comprises a laser projector such as those available from Symbol Technologies, Incorporated. However, it should be understood that other types of projection devices may be used.

In the embodiment illustrated in FIG. 1, image projector 54 comprises a pair of arms 56 and 58 rotatably coupled to each other. In the illustrated embodiment, arm 58 is configured to output a projected image (e.g., via an output lens or element 60). In the embodiment illustrated in FIG. 1, arm 56 is rotatably coupled to a portion of housing 38 to facilitate rotation of arm 56 inwardly/outwardly relative to housing 38 in the directions indicated by arrow 57 about an axis A1. Arm 58 is rotatably coupled to arm 56 to facilitate rotation of arm 58 about an axis A2 relative to arm 56. In the embodiment illustrated in FIG. 1, arms 56 and 58 are configured to be variably positionable relative to each other and to housing 38 to facilitate directional control of image projections by image projector 54. In FIG. 1, a portion of image projector 54 is illustrated in phantom in a non-stored and/or operational position after manipulation of arms 56 and 58. In some embodiments of the present invention, image projector 54 comprises an audio output 54a for outputting audio signals, a volume control button 54b, a power button 54c, and/or any other desired device/control button for operating image projector 54. It should be understood that components 54a-54c may be otherwise disposed on image projector 54 and/or housing 38. Further, it should be understood that image projector 54 may also be controlled using computer device 12 (e.g., power on/off, audio on/off, volume control, etc.). In the illustrated embodiment, a locking mechanism 61 is used to secure image projector 54 in a stored position relative to housing 38 (e.g., to prevent rotation of arm 56 about axis A1 and/or arm 58 about axis A2). Locking mechanism 61 may comprise a push button mechanism, spring-based lock, push-push ejection mechanism, friction-based mechanism, or any other type of mechanism for securing image projector 54 in a stored position.

In the embodiment illustrated in FIG. 1, connector port 31b is communicatively couplable to connector port 31a of computer device 12 to facilitate data and/or power communication between computer device 12 and power supply 11. It should be understood that data and/or power may be otherwise communicated between computer device 12 and power supply 11 (e.g., via wireless communications, cabling, etc.). Thus, in some embodiments of the present invention, battery cells 51 of power supply 11 are used to supply power to computer device 12. It should also be understood that image projector 54 may be operated using power provided by battery cells 51, power supplied by computer device 12 (e.g., by an internal battery of computer device 12, an external power supply coupled to computer device 12 (e.g., an A/C adapter), or otherwise) and/or an external power supply coupled directly to power supply 11 (e.g., an A/C adapter). Battery cells 51 may be charged using power supplied by computer device 12 and/or an external power supply coupled directly to power supply 11.

Figure 2:
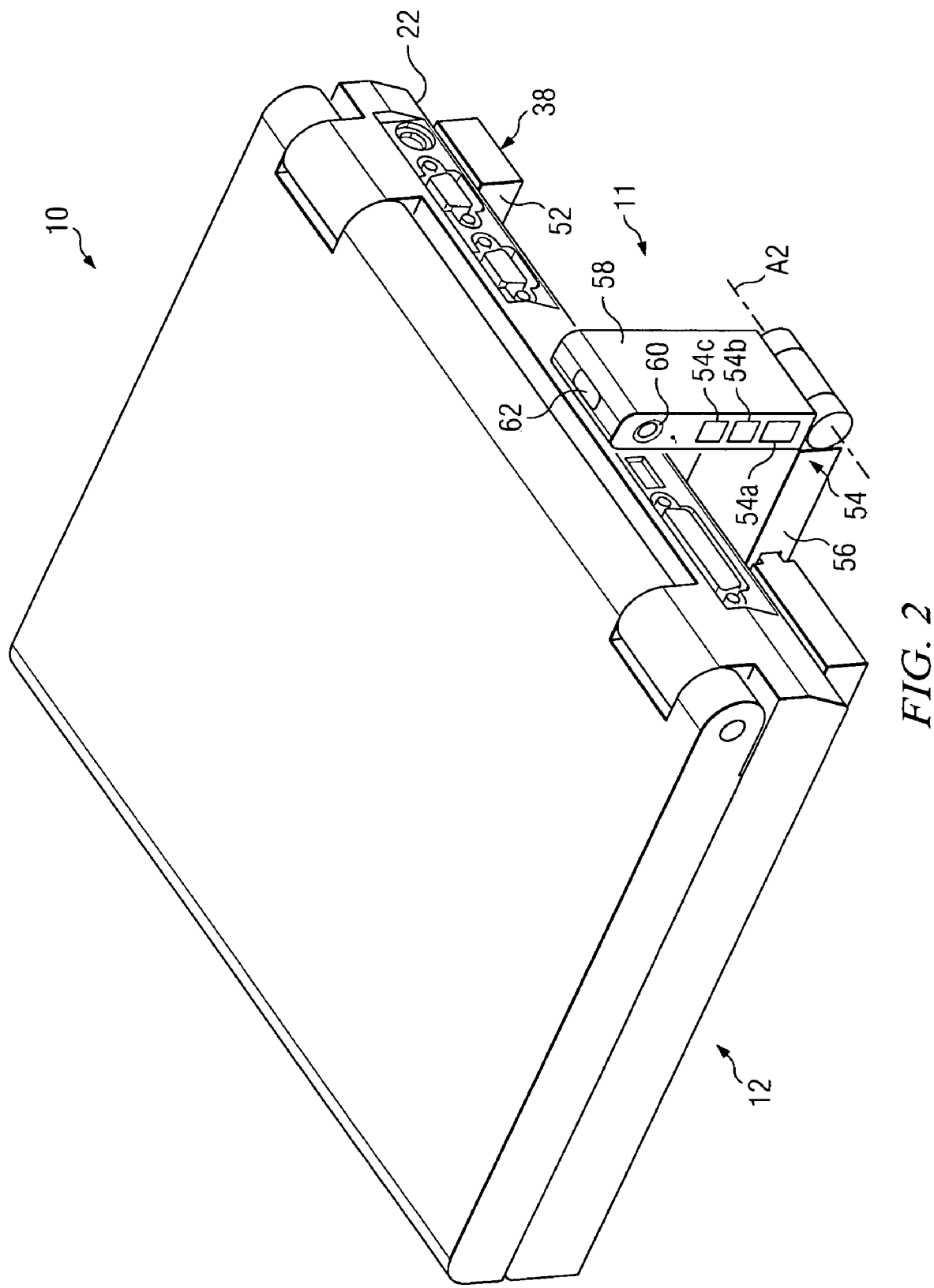
FIG. 2 is a diagram illustrating another view of the integrated portable computer projector system of FIG. 1.

FIG. 2 is a diagram illustrating another view of system 10 of FIG. 1. In the embodiment illustrated in FIG. 2, power supply 11 is coupled to bottom surface 22 of computer device 12, and image projector 54 is illustrated in an extended position relative to computer device 12 and/or housing 38 of power supply 11. For example, in the illustrated embodiment, arm 56 has been rotated about axis A1 (FIG. 1) to extend outwardly from housing 38, and arm 58 has been rotated about axis A2 to a generally upright position, thereby enabling image output from image projector 54 in a desired direction (e.g., via output element 60). It should be understood that arms 56 and 58 may be moved relative to each other and relative to housing 38 (e.g., about axes A1 and A2) to return image projector 54 to a stored position (FIG. 1). Thus, embodiments of the present invention integrate image projector 54 into a power supply device attachable to computer device 12 (e.g., power supply 11 with battery cells 51), thereby enabling image projector 54 and computer device 12 to be transported together as a unit.

In some embodiments of the present invention, image projector 54 is usable while detached from computer device 12 (e.g., not directly attached and/or mounted to a surface of computer device 12). For example, in a detached mode of operation, housing 38 functions as a support base to enable arms 56 and 58 to be directionally oriented to facilitate image projection in a desired direction. In a detached mode of operation, data communications between image projector 54 and computer device 12 may be provided via a wired or wireless communication medium (e.g., a wired connection between image projector 54 and computer device 12 and/or via a wireless transceiver 62 of image projector 54). Power for operating image projector 54 in a detached mode may be provided via battery cells 51 (FIG. 1), computer device 12 (e.g., via a wired connection) and/or an external power supply directly coupled to image projector 54.

Figures 3, 4:
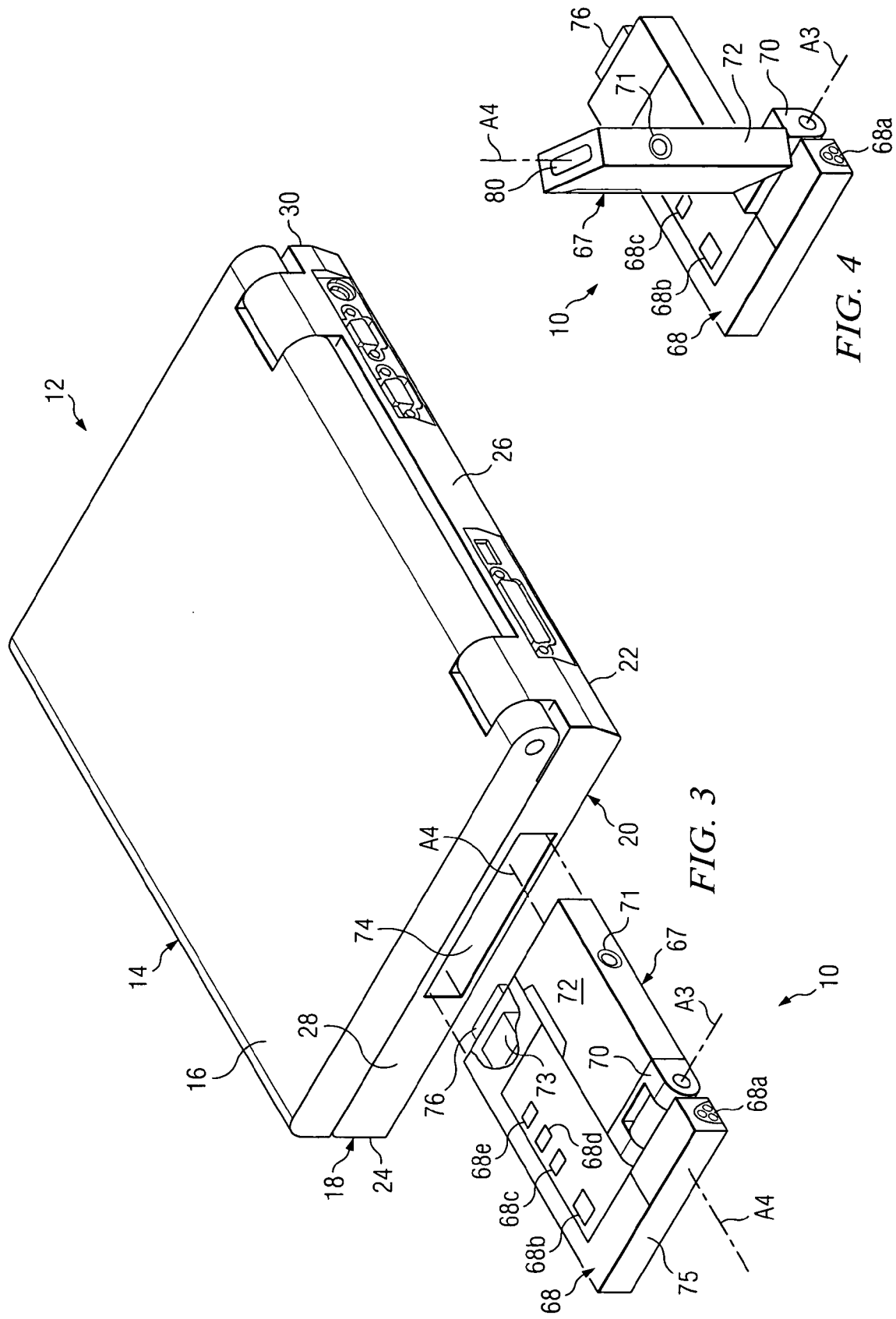
FIG. 3 is a diagram illustrating another embodiment of an integrated portable computer projector system in accordance with the present invention.
FIG. 4 is a diagram illustrating a portion of the integrated portable computer projector system of FIG. 3.

FIG. 3 is a diagram illustrating another embodiment of integrated portable computer projector system 10 in accordance with the present invention. In the embodiment illustrated in FIG. 3, system 10 comprises an image projector 67 removably insertable into housing 20 of computer device 12. In FIG. 3, image projector 67 is illustrated as being detachable from computer device 12; however, it should be understood that image projector 57 may be supported on a retractable tray or other device to remain connected and/or supported by computer device 12.

In the embodiment illustrated in FIG. 3, image projector 67 comprises a housing 68, an arm 70 rotatably coupled to housing 68 for rotational movement of arm 70 about an axis A3 relative to housing 68, and an arm 72 rotatably coupled to arm 70 for rotational movement of arm 70 about an axis A4 relative to arm 70. Image projector 67 comprises an output element or lens 71 for projecting an image from image projector 67. In the embodiment illustrated in FIG. 3, housing 68 comprises a plurality of battery cells 73 stored therein for providing power to image projector 67. However, it should be understood that image projector 67 may also be powered by computer device 12 and/or an external power supply. In the illustrated embodiment, image projector 67 also comprises an A/C power adapter jack 68a, an audio output 68b, input elements for controlling the output of image projector 67 such as, but not limited to, a volume control button 68c, a zoom control button 68d and a power button 68e. However, it should be understood that image projector 67 may comprise additional or alternative control features. Further, it should be understood that battery cells 73 may be used to provide power to computer device 12 and/or be rechargeable by computer device 12.

In the embodiment illustrated in FIG. 3, housing 20 of computer device 12 comprises at least one multi-bay slot 74 disposed on side surface 28 sized to receive and store at least a portion of image projector 67. For example, slot 74 is preferably sized to store image projector 67 therein such that, in the stored position, an outer surface 75 of image projector 67 is disposed substantially flush with surface 28 (i.e., flush or slightly below/slightly extending beyond surface 28). It should be understood that multi-bay slot 74 may be otherwise disposed on computer device 20 (e.g., on front surface 24, rear surface 26, side surface 30, etc.). In the embodiment illustrated in FIG. 3, image projector 67 comprises a connector 76 for communicatively engaging a corresponding connector of computer device 20 disposed within slot 74 to facilitate data and/or power communication therebetween.

FIG. 4 is a diagram illustrating another view of image projector 67 of FIG. 3. In FIG. 4, image projector 67 is illustrated as having been removed from slot 74 (FIG. 3). Housing 68 is configured to support image projector 67, and arms 70 and 72 are manipulatable to enable directional control of image output of image projector 67. In FIG. 4, arm 70 is illustrated as having been rotated about axis A3 to locate arm 72 in a generally upright position, and arm 72 is illustrated as having been rotated about axis A4 to facilitate directional control of image content output by image projector 67. In some embodiments of the present invention, image projector 67 is configured for wireless communications with computer device 12 (e.g. via a wireless receiver 80). However, it should be understood that data and/or power communications may be provided via a wired connection between image projector 67 and computer device 12.

Thus, embodiments of the present invention provide an image projector integrated with a portable computer device, thereby enabling the image projector to be easily stored within or coupled to the computer device, thereby reducing the likelihood of misplacement or damage to the image projector and the need to transport separate components to a presentation. For example, embodiments of the present invention provide an image projector integrally couplable to a device such that the image projector is physically securable to the device (e.g., aside from a mode of data communication between the image projector and the computer device (e.g., a cable)) to facilitate transport of the image projector and the device as a single, integral unit. For example, in the embodiment illustrated in FIGS. 1 and 2, image projector 54 is coupled to and/or otherwise forms part of power supply 11, which in turn is physically couplable to computer device 12. In the embodiment illustrated in FIGS. 3 and 4, image projector 67 is physically coupled to computer device 12 via multi-bay slot 74. Thus, embodiments of the present invention enable an image projector to be coupled to a computer device by a means other than a cable or other wired mode such that the image projector and device are transportable as and/or otherwise form a single unit. Preferably, the image projector is configured to be contained within the overall profile of the device when the image projector is at least disposed in a stored position relative to the device (or at least substantially within the profile of the device), thereby facilitating transport of the image projector and the device as a unit. Additionally, embodiments of the present invention enable the image projector to be independently powered, provide power to the computer device, receive power from the computer device, or receive power from another external source. Further, in embodiments of the present invention where the image projector is self-powered (e.g., via battery cells 51 or 73), recharging of the battery cells 51 or 73 may be performed by the computer device 20 or another external power source. Also, embodiments of the present invention enable operation of the image projector while being detached from the computer device, thereby providing additional flexibility for using the image projector.

What is claimed is:

1. An integrated portable computer projector system, comprising:
   a computer device contained in a computer housing;
   a power supply contained in a power supply housing, the power supply housing being attachable and detachable to the computer housing, the power supply being configured to provide power to the computer device when attached to the computer housing; and
   an image projector integrally formed in the power supply, the image projector being recessed within the power supply housing.

2. The system of claim 1, where the computer housing comprises a base with a connection port; and
   the power supply housing comprises a corresponding connection port to connect with the connection port of the computer housing on the base.

3. The system of claim 1, wherein the image projector is configured having a battery.

4. The system of claim 1, wherein the image projector comprises a lens for projecting images, the lens being attached to an arm that is rotatable to extend outward from the power supply housing.

5. The system of claim 1, wherein the power supply housing with the image projector is slidably insertable into a bay of the computer device.

6. The system of claim 1, the power supply being configured to be detached from the computer and the image projector is configured to operate independently from the computer device when the power supply is detached.

7. The system of claim 1, wherein the image projector is extendable from a stored position to facilitate projection of image content in a desired direction.

8. An integrated portable computer projector system, comprising:
   a computer device contained in a computer housing;
   means for supplying power to the computer device, and being contained in a power supply housing;
   means for connecting the power supply housing to the computer housing where the power supply housing is attachable and detachable to the computer housing; and
   means for projecting image content to a desired location, the means for projecting being integrally formed in the power supply housing.

9. The system of claim 8, where the means for projecting is configured in a recessed portion of the power supply housing.

10. The system of claim 8, where the computer housing comprises a base surface and the power supply housing being attachable and detachable to the base surface.

11. The system of claim 8,
    the computer device comprising a bay; and
    the power supply housing is slidably insertable within the bay of the computer device.

12. The system of claim 8, wherein the means for projecting is extendable from a stored position from the power supply housing to facilitate projection of image content in a desired direction.

13. A method of manufacturing an integrated portable computer projector system, comprising:
    configuring a power supply within a power supply housing;
    providing an image projector;
    integrally configuring the image projector to the power supply housing, the image projector being recessed within the power supply housing;
    providing a computer device comprising a computer housing, the power supply housing being attachable and detachable to the computer housing to provide power to the computer device and to provide image projection.

14. The method of claim 13, further comprising configuring the image projector to form part of the power supply.

15. The method claim 13, further comprising configuring the image projector having a battery.

16. The system of claim 13, further comprising configuring the the power supply housing to be slideably insertable into a bay of the computer device.

17. The system of claim 13, further comprising configuring the image projector to be usable in a detached mode relative to the computer device.

18. The system of claim 13, further comprising configuring the image projector to be extendable from a stored position to facilitate projection of image content in a desired direction.

19. The system of claim 13, further comprising configuring the image projector to wirelessly communicate with the computer device.

* * * * *

UNITED STATES PATENT AND TRADEMARK OFFICE
CERTIFICATE OF CORRECTION

| | | |
|---|---|---|
| PATENT NO. | : 7,641,348 B2 | Page 1 of 1 |
| APPLICATION NO. | : 11/344039 | |
| DATED | : January 5, 2010 | |
| INVENTOR(S) | : Memphis-Zhihong Yin et al. | |

It is certified that error appears in the above-identified patent and that said Letters Patent is hereby corrected as shown below:

In column 5, line 36, in Claim 6, before "the" insert -- wherein --.

In column 6, line 36, in Claim 16, before "power" delete "the".

Signed and Sealed this

Twentieth Day of April, 2010

David J. Kappos
*Director of the United States Patent and Trademark Office*